W. C. JONES.
COMPUTING ATTACHMENT FOR DIAL SCALES.
APPLICATION FILED SEPT. 28, 1914.
1,225,134.
Patented May 8, 1917.
2 SHEETS—SHEET 1.
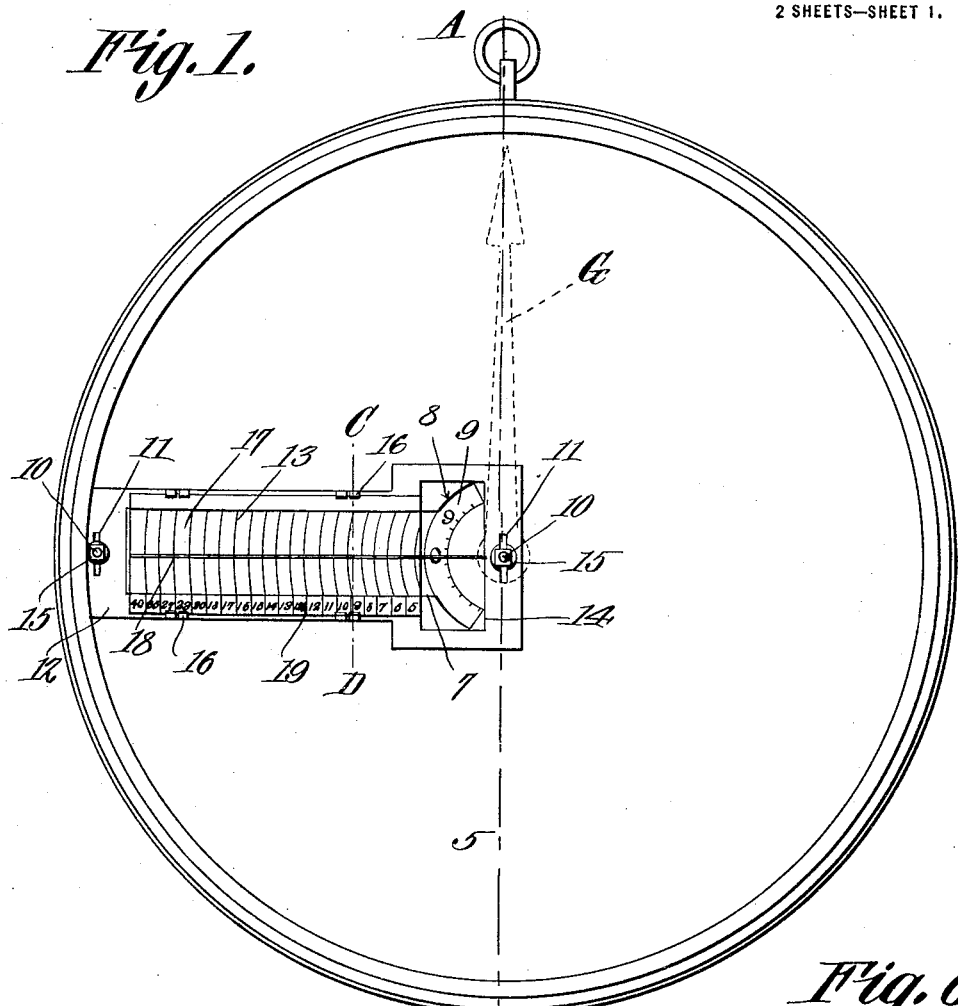
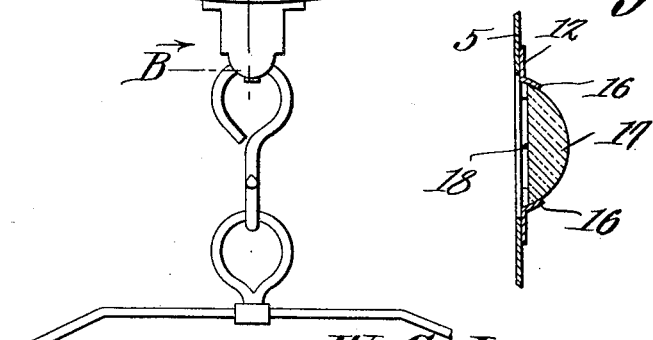
Witnesses
Inventor,
W. C. Jones
by
Attorneys.

W. C. JONES.
COMPUTING ATTACHMENT FOR DIAL SCALES.
APPLICATION FILED SEPT. 28, 1914.

1,225,134.

Patented May 8, 1917.
2 SHEETS—SHEET 2.

Witnesses
F. B. Worden
M. E. McCarthy

W. C. Jones Inventor,
by C. A. Snow & Co.
Attorneys.

UNITED STATES PATENT OFFICE.

WESLEY CORRY JONES, OF PORTLAND, OREGON.

COMPUTING ATTACHMENT FOR DIAL-SCALES.

1,225,134.  Specification of Letters Patent.  Patented May 8, 1917.

Application filed September 28, 1914. Serial No. 863,907.

*To all whom it may concern:*

Be it known that I, WESLEY CORRY JONES, a citizen of the United States, residing at Portland, in the county of Multnomah and State of Oregon, have invented a new and useful Computing Attachment for Dial-Scales, of which the following is a specification.

This invention relates to a computing attachment for dial scales.

While there is a constant demand for dial scales having computing means, the same has not come into general use for the reason that such scales as heretofore constructed have been extremely costly and not within the means of the ordinary merchant. Rather than go to the expense of purchasing high priced computing dial scales, merchants, generally, dispense altogether with the use of such scales and employ ordinary scales without the computing means.

One of the objects of the present invention is to provide an attachment which can be applied readily to dial scales of different grades whereby it becomes possible for the merchant to quickly and accurately determine the selling price of the material on the scale, this computing attachment being simple, durable and inexpensive and being applied readily to the scale so that, by its use, the scales will have every advantage of the high priced computing dial scales now on the market.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings the preferred form of the invention has been shown.

In said drawings:—

Figure 1 is a rear elevation of a dial scale having the present improvements attached thereto.

Fig. 6 is a section through the crystal and its holding plate, said section being taken on the line C—D Fig. 1.

Figure 5:
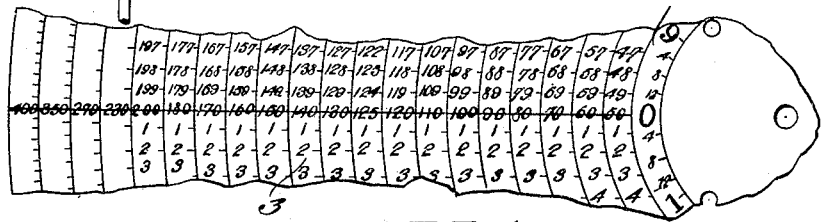
Fig. 5 is an elevation of a portion of the computing dial.

Referring to the figures by characters of reference E designates dial scales of any preferred construction, the scales in the present instance being provided with an arbor F to one end of which an index or hand G is connected, this index working behind a glass H. Scales of this type as ordinarily constructed are also provided with a hand similar to the hand G upon the arbor F at the other side of the scales so that the weight of the material supported by the scales is indicated both to the customer and to the merchant. In order to apply the present improvement to the ordinary type of dial scales it is first necessary to remove the hand connected to the back end of the arbor F and likewise to remove the glass face and the stationary dial ordinarily arranged upon the back of the scales. After these parts have been removed a disk 1 having a central tubular boss 2 is placed upon the rear projecting end portion of the arbor F so as to rotate therewith, this disk 1 being bolted or otherwise secured to a computing disk 3 formed of sheet metal or any other suitable material. This computing disk is provided with a plurality of concentric circles, as shown in Fig. 5, the space between the innermost circles containing a circular series of numerals ranging from zero (0) to nine (9) the spaces between the numerals being sub-divided to indicate ounces. These weight indicating numerals are so positioned on the dial 3 that, when the hand G is indicating a certain weight, the numeral on the dial 3 designating the corresponding weight will appear at a predetermined point. The spaces between the other circular lines on the dial 3 contain numerals indicating prices to be charged for the different amounts at different prices per pound.

After the dial 3 has been positioned on the arbor F, spacing sleeves 4 are arranged upon the back face of the casing E and a face plate 5 is placed against the outer ends of the sleeves and secured thereto by screws 6 which are extended through the face plate 5 and through the sleeve 4 into engagement with the casing of the scales. The face plate 5 is provided with a slot 7 normally extending horizontally and located between the center of the face plate and the periphery thereof. The inner end of this slot merges into an arcuate slot 8 concentric with the center of the face plate, the weight indicating numerals on the dial 3 and which have been indicated generally at 9 in Figs. 1 and 5 being adapted to appear within this arcuate slot 8.

Threaded studs 10 extend outwardly from the face plate 5 adjacent the ends of the slot 7 and these studs project through parallel slots 11 formed in the end portions of a holding plate 12. Said holding plate has a longitudinal slot 13 merging at one end into an enlargement 14 and, when the plate 12 is in position on the face plate 5, the slot 7 will be directly back of the slot 13 while the arcuate slot 8 will appear within the enlargement 14. Clamping nuts 15 engage the stud 10 and by means thereof the plate 12 can be held against movement relative to the face plate 5. By loosening these nuts, however, vertical adjustment of the plate 12 is permitted.

Outstanding from the side portions of the slot 12 are retaining ears 16 preferably formed by cutting them from the side walls of the slot. An end ear 15 is provided at the outer end of the slot 13. A magnifying crystal 17 extends throughout the length of the slot 13 and has its opposed portions engaged by the ears 16 while one end abuts against the ear 15. The crystal does not extend over the enlargement 14. The crystal is so constructed that, although the numerals indicating the purchase prices are comparatively small, they will, when brought back of the center of the crystal, be greatly magnified so as thus to be easily read by the merchant. A wire 18 or the like is preferably arranged longitudinally along the center of the flat or inner face of the crystal, this wire being held in position in any suitable manner, as by attaching it to the plate 12. This wire is adapted to facilitate the location of the proper price numerals, it serving to indicate both the weight and various prices to be charged. A series of numerals, indicated at 19 is arranged back of or under the lower portion of the crystal, these numerals being adapted to register with the different series of numerals on the dial 3 and said numerals 19 being employed to designate different prices per pound. The various numerals on the dial are so positioned that, for example, should the numeral 9 be in position back of indicator, the numeral in vertical alinement with the numeral 10 of the series 19 and indicated by the wire 18 will accurately designate the cost of nine pounds at ten cents per pound. The numeral 9 will not of course be brought to position back of the indicator or wire 18 until nine pounds of material have been placed upon the scales.

Figure 2:
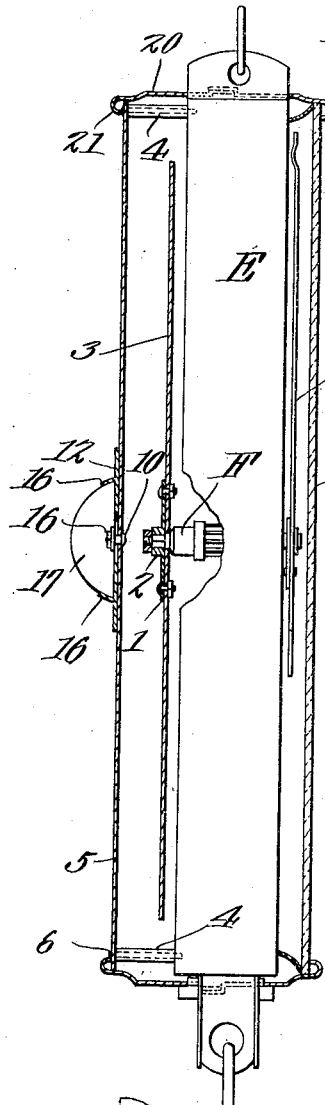
Fig. 2 is a section through the attachment on line A—B Fig. 1, the same being shown in position on the scales and said scales being shown in elevation, a portion of the casing of the scales being broken away.
Figure 4:
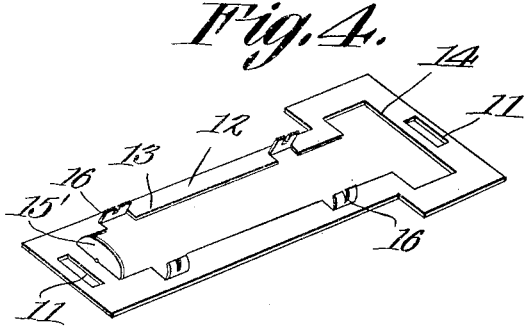
Fig. 4 is a perspective view of the crystal holding plate, said crystal being removed.
Figure 3:
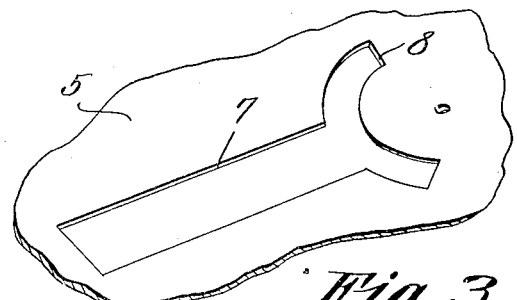
Fig. 3 is a perspective view of a portion of the face plate of the attachment.
Figure 7:
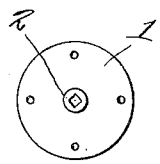
Fig. 7 is a detail view of the means employed for connecting the computing dial to the arbor of the scales.

Any suitable finishing means can be provided for the attachment. As shown in Fig. 2 a housing 20 can be placed about the casing of the scales and secured thereto in any suitable manner, the outer edge portions of the housing being inturned as at 21 so as to lap the periphery of the face plate 5 and the margin of the glass 11, respectively.

As the computing attachment is to be sold for quick attachment to an ordinary dial scale, it is necessary that the housing 20 be so constructed that it can be applied readily to the casing of the scales. For this reason the said housing 20 is made up of two opposed rings 22 and 23 respectively which lap at their inner ends, as shown at 24 and have their inner ends cut away to receive the support engaging ear 25 normally provided at the top of the scales E and to receive the slidable member 26 which normally projects downwardly from the scales.

In applying the attachment, the computing dial 3 is first secured to the arbor F of the scales after the hand ordinarily arranged on one end of the arbor has been removed. The two parts of the housing 20 are then placed at opposite sides of the scales E and moved toward each other so as to interfit and completely house the scales. The spacing sleeves 4 will abut against the scales E and hold the face plate 5 properly spaced from the scales. With the parts thus applied the indicating wire can be adjusted as heretofore described.

By so mounting plate 12 that it can be adjusted upwardly and downwardly, the indicator or wire 18 and the crystal 17 can be adjusted upwardly or downwardly so as to properly enlarge all numerals extending along a horizontal line radiating from the center of the dial 3.

What is claimed is:—

1. A computing attachment for dial scales, comprising oppositely extending interfitting rings forming a housing, said rings having registering cut away portions for the reception of projecting parts of scales, a glass carried by one of the rings, a face plate carried by the other ring, said face plate having a radial slot, a marker extending across the slot and adjustable relative thereto, and a computing dial within the housing for attachment to the index arbor of the scales.

2. A computing attachment for dial scales, comprising a cylindrical housing made up of opposed interfitting rings having registering cut away portions for the reception of projecting parts of the scales contained within the housing, a glass carried by one of the rings, a face plate carried by the other ring and having a radial slot, spacing elements extending from said face plate for engaging one side of scales contained within the housing, a marker extending along and adjustable across the slot, and a computing dial within the housing for attachment to the index arbor of scales within the housing.

3. The combination with dial scales including an index arbor, said scales having oppositely extending projecting portions, of a computing attachment comprising a housing detachably mounted upon and concentric with the scales, said housing consisting of opposed interfitting rings movable together from opposite sides of the scales to house the scales, a glass carried by one of the rings, a slotted face plate carried by the other ring, a marker extending across and adjustable relative to the slot in the face plate, and a computing dial secured to the index arbor of the scales, and means for holding the face plate at a fixed distance from the computing dial, the rings of the housing being provided with registering cut away portions for the reception of the projecting parts of the scales.

In testimony that I claim the foregoing as my own, I have hereto affixed my signature in the presence of two witnesses.

WESLEY CORRY JONES.

Witnesses:
RICHARD L. MERRICK,
EDGAR J. BRYAN.

Copies of this patent may be obtained for five cents each, by addressing the "Commissioner of Patents, Washington, D. C."